United States Patent [19]
Hartman

[11] 3,748,468
[45] July 24, 1973

[54] AUTOMATIC ELECTRON MICROSCOPE FIELD COUNTER

[75] Inventor: Arie W. Hartman, Gaithersburg, Md.

[73] Assignee: General Electric Company, New York, N.Y.

[22] Filed: Dec. 22, 1971

[21] Appl. No.: 210,982

[52] U.S. Cl. .................. 250/49.5 A, 250/49.5 R
[51] Int. Cl. ............................................ H01j 37/26
[58] Field of Search ................. 250/49.5 R, 49.5 A, 250/49.5 PE; 350/162 SF

[56] References Cited
UNITED STATES PATENTS

| | | | |
|---|---|---|---|
| 3,614,311 | 10/1971 | Fujiyasu et al. | 250/49.5 A |
| 3,550,084 | 12/1970 | Bigelow et al. | 350/162 SF |
| 3,561,859 | 2/1971 | Hecksher et al. | 350/162 SF |

Primary Examiner—James W. Lawrence
Assistant Examiner—B. C. Anderson
Attorney—Allen E. Amgott et al.

[57] ABSTRACT

Electron microscope stage is equipped with remotely controlled stepping devices; cycling signals cause presentation of successive fields, whose image is fed by fiber optics to a television image tube, such as an image orthicon, or an intensified vidicon. Image seen by orthicon is reproduced on oil-film light-valve. Coherent collimated light is fed through oil-film to a transform lens, located its own focal length from oil film; transform filter is transparent only to transform of particular shape to be identified, and is located at back focal plane of transform lens. Imaging lens is located with its front focal plane at filter; viewing screen at back focal plane of imaging lens shows field corresponding to microscope field, with light spots showing where objects matching filter in shape and size appear in field. Automatic spot counting plus automatic indexing of stage provide automatic field count.

2 Claims, 5 Drawing Figures

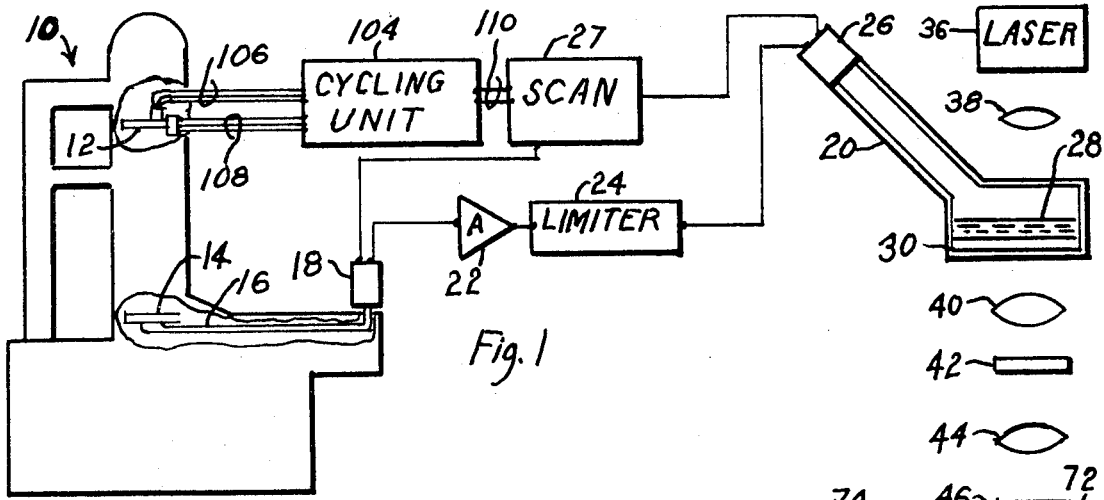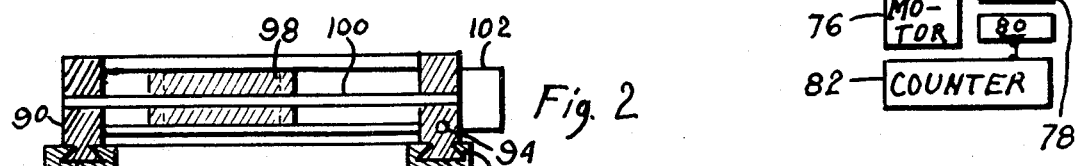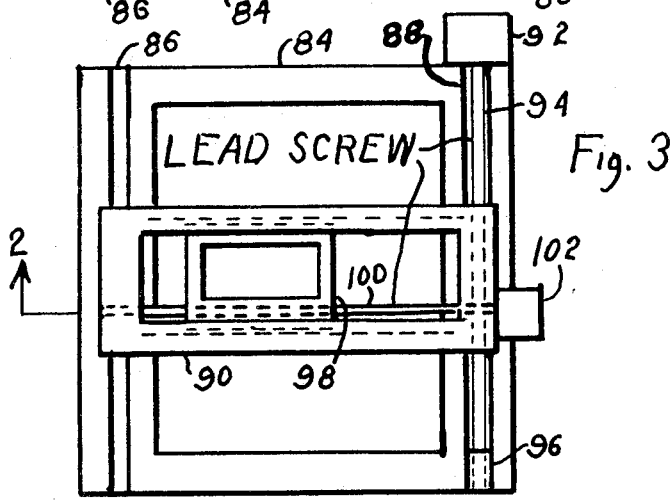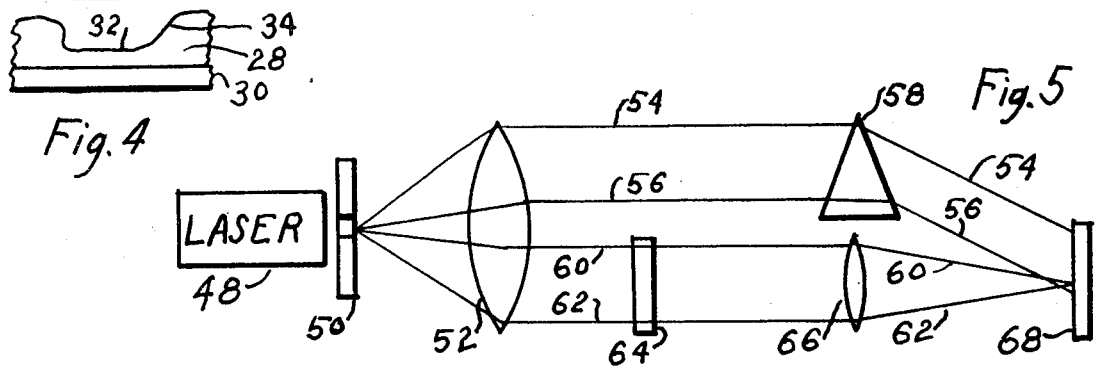

AUTOMATIC ELECTRON MICROSCOPE FIELD COUNTER

BACKGROUND OF THE INVENTION

1. Field of the Invention

This invention pertains to the art of automated microscopy.

2. Prior Art

The identification of given cells may be facilitated by selective staining, or examination by fluorescence, but the counting of cells of particular morphology has always required the intervention of a human operator.

SUMMARY OF THE INVENTION

The image from an electron microscope is scanned over a small area, and the scanned image is stored temporarily on a convenient surface, e.g., a refracting surface which is distorted by charges deposited upon it, such as an oil film. Coherent light is transmitted first through the storage surface, and then through Fourier optics, and through a correlation filter which matches the particular shape of the particle, e.g., virus to be identified and counted. The light transmitted by the correlation filter is passed through a correlation lens to form small bright dots which represent the location of particles whose outline matches the filter. These may be counted by means of a moving slit scanner controlling the input field of view of a photoelectric counter, or more sophisticatedly by projection on a photosensitive surface which can be scanned electronically.

In practice the electron microscope is provided with an automatically driven stepped stage, and the successive field portions are brought before a television type camera (which may conveniently be coupled to the electron microscope phosphor by fiber optics, thus permitting the use of a conventional electron microscope). The particle edges may be emphasized by high-frequency emphasis or amplitude clipping of the camera signal or both. The oil surface storage device is a conventional form of light valve employed for high-intensity television projection. Unfortunately, the correlation system is sensitive to orientation, so that if the filter is matched to particles that do not have central symmetry, particles not aligned in the manner for which the filter is made will not be counted. However, many particles of interest do have central symmetry; and for a random orientation of those which do not have circular symmetry, the fraction not counted will be constant and predictable, so that the counts can be corrected, and thus become significant. Alternatively, duplicate light valves may be used with the correlation optical system following one at right angles to that of the other; or some other equivalent means may be employed to apply the images from the microscope at different orientations to the correlation system.

BRIEF DESCRIPTION OF THE DRAWINGS

FIG. 1 represents schematically an embodiment of my invention.

FIGS. 2, 3, and 4 represent details of FIG. 1.

FIG. 5 represents a way of making one of the elements represented in FIG. 1.

DESCRIPTION OF THE PREFERRED EMBODIMENT

FIG. 1 represents an electron microscope 10, provided with a remotely controlled mechanical stage 12, represented in more detail in FIGS. 2 and 3, and presenting its output, a magnified view of a part of the sample on the stage 12, at luminescent screen 14. The image on screen 14 is transmitted by fiber optics 16 to the photocathode of a vidicon 18, which is scanned, conveniently in a conventional television-type raster, identical to and synchronous with the scanning applied to an oil-film light valve 20. The output signal from vidicon 18 is amplified by a conventional amplifier 22, and is passed through a limiter 24, which by conventional amplitude limiting removes small variations in the level of the signal representing the presence of a particle in the field, so that when the reading beam of the vidicon 18 sweeps across a particle, the output signal suffers a marked change in amplitude at the boundary of the particle, and this changed amplitude continues constant to the other boundary of the particle. This signal (after any necessary amplification and/or polarity inversion) is applied to the control grid of electron gun 26 of oil-film light valve 20. The beam from the gun 26 is scanned by scan 27 synchronously with the scanning of vidicon 18, and deposits charges upon oil film 28, which lies upon transparent conductive substrate 30. The charges stored on oil film 28 constitute a representation of the processed signals from vidicon 18; and the electric forces upon the oil film 28 distort its surface, so that as shown in FIG. 4, an enlarged detail of FIG. 1, the film is thinner where (32) it has been bombarded by the electron beam. Since the film is transparent, its gross transparency is not altered much by its becoming thinner, but because its refractive index is greater than one it will present a different optical path length. If the thickness of the film is reduced by an amount L, and its index is $n$, the optical path length in the vacuum above its surface will be increased by L, but the optical path length through the oil will be reduced by $Ln$, giving a net change of $L(n-1)$. It is possible that, by sheer accident, the path length might be changed by an even number of wavelengths, so that the phase change produced would be undetectable. However, this cannot be true at the boundaries 34 between the bombarded and the unbombarded areas, where the thichness varies continuously. It may be shown that a phase-shifting transparency may be Fourier-transformed by a lens in the same way as a variable-density image; and, since the boundaries of the shapes to be identified are the identifying parameters, the use of the deformed transparent oil film will permit the identification of characteristic boundaries, even if the thinning of the oil by an integral number of wavelengths should occur by chance inside the bounded area.

Returning to FIG. 1, coherent light from laser 36, collimated by lens 38, is passed through the surface of substrate 30, which lies in the front focal plane of lens 40. By well-known optical principles, in the back focal plane of lens 40 there will appear the Fourier transform of the image formed in the oil 28 on substrate 30. (The upper surface of the envelope of the light valve 20, like that carrying transparent substrate 30, must be optically flat and of optical quality glass.) A filter 42 is placed in the back focal plane of lens 40, this filter having opacities everywhere except at the components of the transform of the particular shape of particle to be selected. Another lens 44 has its front focal plane at the filter 42, and may have a diffusing or lenticular transmissive viewing screen 46 at its back focal plane. It may be shown that the images of the selected particle shape will be transmitted (in transform) by the filter 42, and will form at viewing screen 46 images of their shape, brighter than the remainder of the field, and in the location in the field corresponding to their original images. Imperfections in optical surfaces and random errors of various sorts will cause some light in the field outside of the images of the selected objects, so that it is not true that the latter images will appear alone, but they will be detectable just as photographed images appear despite lens imperfections and scattered light.

The manner of making the filter 42 is described in detail in the IEEE Transactions on Information Theory Vol. 10, pages 139 through 145 (1964) by A. Vander Lugt, to which reference is incorporated. The FIG. 5 of Vander Lugt employs plane mirrors to bring into superposition coherent collimated light from a source and the Fourier transform of a transparency whose Fourier transform is to be produced in the mask. I prefer a device which produces the same effect by the use of lenses, thereby avoiding the problems of exact alignment of mirrors, and avoiding the losses in a beam splitter which Vander Lugt employs. In my FIG. 5 a laser 48 followed by an aperture in a screen 50 serves as essentially a point source of coherent light, which is collimated by lens 52. Such collimated coherent light bounded by rays 54 and 56 is refracted by prism 58. Collimated coherent light bounded by rays 60 and 62 is passed through transparency 64, which bears an image of the particular shape which the filter is intended to identify. A transform lens 66 is located so that transparency 64 is at its front focal plane, and a reversal type film 68 is located at its back focal plane. At the surface of film 68 the Fourier transform of the transparency 64 is formed by rays bounded by 60 and 62 after their refraction by lens 66; but such a transform includes phase information which can be converted to amplitude only by combination with a reference, which is provided by the light refracted by prism 58. The resulting interference pattern exposes film 68 which, after development and reversal, constitutes filter 42 for identifying the particular image originally on transparency 64. Since my interest is primarily in the outline of the image, a black-and-white or opaque-and-transparent transparency and filter are adequate, and the problems of gamma do not exist.

In order to automate the counting of the spots of light appearing in the plane of viewing screen 46, I provide (FIG. 1) a moving slit 72 in a disk 74 which is rotated by a motor 76, so that the slit scans across the field of viewing screen 46, and light passing through the slit is focussed by lens 78 upon a photosensitive device 80. If the individual light spots are sufficiently sparsely distributed, a pulse of light will reach photosensitive device 80 for each such spot, for each passage of the slit. However, if two light spots happen to lie on a line joined by the slit when it passes opposite them, only one pulse will appear. This may be avoided by replacing the slit with a plurality of staggered holes in the well-known structure of the Nipkow scanning disk, so that the field is scanned in lines, and each individual light spot will be read individually. More sophisticatedly, a television-type device may be used to receive the image of the entire field, and be scanned to develop a pulse signal for each spot. Alternatively, the field of view may be subdivided by applying to it an array of individual photosensors, storing the output of each in one stage, e.g., of a shift register, and then shifting out the stored bits serially to a counter. Whatever type of spot reading device is employed, its output is fed to a counter 82, which accumulates the individual spot counts.

Thus far the manner of scanning a single field of the sample on stage 12 has been described. However, the great magnification obtainable with an electron microscope renders it highly desirable to provide for automatic survey of a number of approximately contiguous fields. For completeness of disclosure, FIGS. 2 and 3 represent schematically, partly in section, plan and elevation, respectively, of a remotely controllable stage 12. A rectangular skeleton base 84 is provided at its ends with dovetail slots 86 and 88 to engage mating parts of a skeleton subbase 90. A stepping motor 92 which advances a small fraction of a revolution at each electrical pulse input to its terminals, drives a lead screw 94 which engages a threaded portion of subbase 90, the end of lead screw 94 being supported by a bearing block 96 which is part of base 84. Carrier 98 fits in slots in subbase 90, and has a threaded portion which engages lead screw 100, which is driven by step motor 102, similar to step motor 92, the distal end of lead screw 100 being supported by a bearing in the end portion of subbase 90.

In FIG. 1, cycling unit 104 is represented as connected by leads 106 to stepping motor 92 and by leads 108 to stepping motor 102. Typical size of a field seen by electron microscope 10 could be 5 by 5 microns; this field is scanned typically at 200 frames per second by vidicon 18, and applied to oil film 28 at the same scanning rate, provided by scanning unit 27. (It may be observed here that the exemplary form of light valve 20, in which the electron gun is at an angle, requires that the scan applied to the electron beam of 20 be corrected for keystoning, in a manner old in the art from its use in the primeval form of iconoscope.) The cycling unit 104 sets this basic operational frequency, and is therefore connected to scan 27 by leads 110 in order that the frame frequency may be synchronized with the stepping of the mechanical stage 12. The stepping motor 102 is stepped by signals from cycling unit 104 over leads 108 so that the carrier 98 is moved one field width, i.e., 5 microns, at the end of each scanning frame. This continues for, e.g., 200 steps, at the end of which the cycling unit 104 applies a signal via leads 106 to stepping motor 92 to translate subbase 90, and carrier 98 which is upon it, by 5 microns. Simultaneously with this operation, cycling unit 104 applies to stepping motor 102 a new sequence of, e.g., 200 control pulses to step 102 backward, in the opposite direction from its original direction of stepping, in order that the new column may be traversed backward. Thus the sample of width 200 × 5 microns carried by carrier 98 is scanned back and forth for a total of 200 × 5 microns length, for a total scanned area of 1,000 × 1,000 microns, or 1 × 1 millimeter. Since the television frame frequency is synchronized with the rate of stepping from one 5 by 5 micron field of the specimen to the next, each such portion is projected and analyzed optically and has its light spots counted just once; and the total count accumulated in counter 82 will be the number of spots identified in traversing the sample.

It may be of interest to determine the approximation location in the sample of the region in which a particularly large number of spots were counted. Cycling unit 104 will ordinarily include a counter for the number of control steps performed in stepping stepping motor 102; and it is very desirable that it also include a similar counter to count the number of steps of stepping motor 92, in order that it may cease operation automatically when the desired number of fields has been analyzed. The numbers stored in such counters at any time are the coordinates of the particular 5 by 5 micron field being analyzed. These may be fed to a standard printout system of the kind employed conventionally to print the output of electronic computers, together with the accumulated reading of counter 82, the difference between two successive readings from counter 82 being indicative of the number counted in the latter reading; or, if the previously described array of individual photosensors is employed, feeding in parallel into a shift register which is then read out serially, a separate counter may be employed to count the serial readout for each frame, and that figure may be printed together with the values in the two counters of cycling unit 104. Depending upon the information requirements, when the accumulated reading of counter 82 is recorded, it may be adequate to record this reading only at e.g. every 10th frame. To record information for every frame in a 200 by 200 scan (corresponding, under the typical conditions here used, to 1 millimeter by 1 millimeter in the sample) would require the recording of 40,000 observations; consequently simple economy may dictate recording only for every 10th frame on each axis of translation, and thus reducing the record to 400 printed observations.

It is to be noted that the use of charges stored upon a deformable medium is part of the very well known art. U.S. Pat. Nos. 2,391,450 and 2,391,451 to Dr. Friedrich E. Fischer described the application of the method to television projection; a description of the scheme appears in the Journal of the SMPTE, Volume 54, April, 1950, page 393 et seq. under the title "The Eidophor Method for Theater Television" by E. Labin, Federal Telecommunications Laboratories, Inc., Nutley, N.J. It may be noted that the electrical conductivity and the viscosity of deformable viscous fluid media both alter with increasing temperature in a direction to reduce the storage time of the medium. Therefore, for a particular embodiment of my invention, the temperature of layer 28 may be adjusted to provide the proper decay.

The description of the preferred embodiment has been specific; but the various devices employed in it are capable of general description in terms of the functions they perform. Thus 12 is a controllably indexing mechanical stage, cycling unit 104 is broadly cycling means, orthicon 18 is optical-electrical transducing means, whose output is electrical video signals, having substantially only two values, and the oil-film light valve 20 is electrical-optical transducing means. The film 28 is a phase-differential transparency, laser 36 is a source of coherent illumination. Lens 40 is a first Fourier lens, filter 42 is a spatial filter, lens 44 is a second Fourier lens, the locus of 46 is an image plane, and the combination of disk 74, photo-sensitive device 78, and counter 80 constitutes a spot counter.

What is claimed is:

1. Means for automatically determining the relative abundance of objects of a given shape in an electron microscope sample, comprising:
   a. a controllably indexing mechanical stage for holding a sample in an electron microscope, connected to
   b. cycling means which control the mechanical stage to index in succession adjacent portions of the sample for presentation as magnified optical images by the electron microscope;
   c. optical-electrical transducing means for converting a said magnified image into electrical video signals;
   d. electrical-optical transducing means for converting the said electrical video signals into a phase-differential transparency representative of the said magnified image;
   e. a source of coherent illumination directed through the said phase-differential transparency, and thence through
   f. a first Fourier lens,
   g. a spatial filter adapted to pass light distribution corresponding to the said given shape, and
   h. a second Fourier lens, to
   i. an image plane lying in the field of observation of
   j. a spot counter.

2. The device claimed in claim 1 in which the optical-electrical transducing means (c) comprise limiter means to limit the amplitude of the video signals produced thereby to two different values.

* * * * *